UNITED STATES PATENT OFFICE.

HERMAN A. BRASSERT, OF BRADDOCK, PENNSYLVANIA.

METHOD OF MANUFACTURING STEEL.

1,032,655. Specification of Letters Patent. Patented July 16, 1912.

No Drawing. Application filed November 28, 1904. Serial No. 234,513.

*To all whom it may concern:*

Be it known that I, HERMAN A. BRASSERT, a subject of the King of Great Britain and Ireland, residing at Braddock, in the county of Allegheny and State of Pennsylvania, have invented a new and useful Improvement in Methods of Manufacturing Steel, of which the following is a specification.

This invention relates to the manufacture of steel and, as an object, has the provision of a method whereby steel may be produced at the blast furnace.

A further object of this invention has been to provide a method whereby any kind of pig iron may be utilized, whether high or low in phosphorus, and a steel low in phosphorus produced.

A further object of this invention has been to provide a method whereby the yield is far greater than that of the Bessemer process, and whereby the cost of installation is reduced to a minimum, and the operating cost to an extremely low point.

A still further object of this invention has been to provide a method of steel manufacture whereby steel of any desired analysis may be produced from molten iron at the blast furnace without the addition of heat external to the blast, and whereby the initial heat of the molten iron from the furnace, as well as the liquid cinder from the blast furnace, may be utilized.

A still further object of this invention has been to provide a method for the manufacture of steel whereby a great mass of iron, such as from 50 to 200 tons direct from the furnace may be converted into steel, and the hot blast from the hot blast stoves utilized.

These and other objects I attain by means of the method hereinafter described.

In carrying out this invention I preferably employ a circular receptacle of dimensions suitable for working from 100 to 200 tons of molten iron. This receptacle is placed as close as possible to the tapping hole of the blast furnace, and the short runner necessary is covered, in order that the minimum amount only of the initial heat of the molten iron will be lost through radiation. The receptacle is lined with acid or basic fire brick, and covered with a brick lined roof.

A suitable number of twyers ranged around the receptacle above the metal line are positioned so as to direct blasts of air downwardly onto the surface of the metal contained therein in such a manner that a rotary or whirling motion is given to the metal. If desired, this receptacle may be replaced by a so-called fore-hearth, forming part of the blast furnace proper, and around this fore-hearth the twyers will be ranged in the manner above described. Into the receptacle or fore-hearth all or a portion of the liquid blast furnace cinder may be run with the molten iron from the blast furnace.

If it is desired to remove all or a portion of the cinder before it enters the receptacle or hearth, suitable skimming apparatus may be employed and that portion not desired, skimmed off.

The twyers connect with an air blast, either derived from the hot stoves of the blast furnace or from any other suitable source, and the blast will consist of air or other oxygen containing fluid, and the pipe therefor may be arranged so that either a hot or cold blast may be admitted to the twyers, as a cold blast is sometimes desirable for lowering the temperature of the bath during portions of the process.

If desirable, the blast may consist of artificially dried air produced either by refrigeration, or by causing the air to contact with electrical discharges or, if found desirable, the air of the blast may be super-charged with oxygen.

Either before or after the molten iron has been run into the receptacle or hearth suitable oxidizing agents, such as iron ore, manganese ore, scale or steel cinders, flue dust or scrap, in suitable quantities, are introduced into the receptacle or hearth, whereby the silicon, manganese, phosphorus, sulfur and carbon are partially or wholly removed.

When the fluid iron in the receptacle or hearth and the oxidizing agents come in contact the reaction sets in, and as soon thereafter as is desired the blast is admitted to the twyers whereby an extremely rapid surface oxidation is obtained, which is controllable at all times by varying the amount or pressure of the blast admitted. The highly oxidizing slag formed on the surface of the bath combined with the oxygen of the blast and the circulation currents set up by the blast rapidly oxidizes the impurities present. From the fact that the blasts are directed onto the surface of the metal instead of into or through the same a steel very much freer from occluded gas is obtained, and, in fact, a steel superior to the product of any known process with which large quantities can be worked.

The action of the oxids on the silicon, manganese, and phosphorus generates sufficient heat to keep the bath liquid, and by directing the blast onto the metal of the bath in the manner described the heat may be increased to any desired degree and there maintained throughout the desired period whereby the reaction is accelerated. The rotary motion given to the bath by the blast insures that all of the metal comes in close contact with the oxids and fluxes and the oxygen of the blast. At the same time, a strongly oxidizing atmosphere is maintained at the contact point of slag and metal thus greatly facilitating and accelerating the reaction.

The acceleration of the reaction is very important as the loss of heat through radiation is considerable, and only a limited amount of heat is available from the oxidation of the elements. By means of the blast accelerating reaction, more heat is accumulated in a given time, and by the blast beating down onto the metal bath the zone of greatest heat is always kept in close proximity to the bath.

By regulating the blast the heat of the bath, as before described, can be varied at will, and this is of extreme importance when dephosphorizing, as the phosphorus will be oxidized and pass into the slag more readily at a low temperature than at a high temperature, yet it will not enter the slag unless the same has a certain degree of fluidity, and with the blast this narrow working limit of temperature can be easily maintained.

The heat generated by the air blast impinging on the surface of the large metal bath, and the heat generated by the great rapidity of conversion of such a great mass of metal, is so intense that more oxids can be worked by this method than by any other methods known to me, and also more cold pig iron and steel scrap can be worked up in the receptacle than by other methods.

As before stated, the heat due to oxidation is conserved and the zone of greatest heat is maintained in close proximity to the bath and does not escape from it as it does from a Bessemer converter or from the receptacle of other open hearth processes as now practiced.

It will, of course, be understood that suitable fluxes, such as limestone or lime, are placed in the receptacle or hearth before or after the molten iron is admitted.

By having the temperature of the bath under control, and by drawing off the phosphoric slag continuously, it is possible to almost entirely remove the phosphorus from the bath before the carbon combustion begins, but, if desired, the phosphorus may be removed after the carbon.

The carbon combustion can be started at any desired time simply by increasing the blast, thereby immediately raising the temperature of the bath, and it will be seen that the carbon can either be completely removed and the charge recarbonized by methods now well known, or else the carbon by means of the regulable blast can be brought down to any desired point corresponding to the percentage required in the finished steel.

In order to increase the carbon contents, or to recarbonize after the method has been completed, it is only necessary to add liquid pig iron which is always available at a blast furnace, or speigel, ferro-manganese or any other of the known recarbonizing agents such as coke, anthracite or coal dust, and this carbon addition may be either given while the metal is in the receptacle or may be added to it in the ladle.

It has been found desirable to maintain a constant bath in the receptacle of from 100 to 200 tons of metal by withdrawing only part of the finished steel at the close of the operation, the said part corresponding in weight to the cast of iron admitted from the blast furnace. The speed of the process may be regulated in such manner that a cast of steel from the receptacle is made about the time another cast of iron from the blast furnace is due.

Various advantages are derived from having a large reservoir of refined metal or steel left in the receptacle from the previous working. The oxids being admitted to the bath made up of the remaining steel before the next cast of iron enters the receptacle, become highly heated, and in this condition react much more readily on the iron as it is admitted. Also by mixing the cast of iron with as much or more of its weight of refined steel, the percentage of impurities in the bath is at once greatly reduced, accelerating the process.

If it is desirable to obtain a steel of very superior quality the process may be regulated so as to finish the bath at a high temperature and allow it to stand in the receptacle, which is tightly sealed, until it is cooled off to the correct temperature for casting into molds. Enough surplus heat is accumulated in the bath by regulating the hot air blasts, to allow the steel to stand for one hour or longer and yet cast it at the correct temperature. By allowing a large bath of steel to remain in the receptacle, shut off from all oxidizing or reducing influences, allows it to settle down and expel all of the occluded gases, and by thus allowing it to settle or age at this high temperature, the superior qualities of crucible steel are given to it.

It has been found that this process is equally applicable to the use of iron of varied analysis, and that the yield is far greater than the yield from the Bessemer process, as the reduction of part of the oxids will more than make up for any loss due to the oxidation of iron.

Owing to the large charge which can be worked, and from the fact that the same is worked at the blast furnace the operating cost per ton of steel produced is naturally very low compared to the cost per ton of steel produced by any other known process, and it is practically as low as the cost of iron, the only additional expense above the regular operating expense of a blast furnace being the pouring of the steel into ingot molds.

It will be seen that the equipment of a plant for carrying out this process will be very much cheaper than a plant of the same capacity operating under either of the Bessemer processes or of any of the known open hearth processes as it will consist of little more than ordinary blast furnace equipment. It will do away with the extra blowing equipment and the expensive hydraulic machinery of a Bessemer plant, as well as the gas producers and regenerators of the open hearth plants. From the fact that the steel from the receptacle, which is located at the blast furnace, can be run direct into ingot molds instead of running the iron, as is now done, into ladles, carrying the ladles to a metal mixture, pouring them, repouring the iron from the mixer into ladles and from the ladles into the converter or open hearth furnace, it will be seen that the cost per ton of steel produced and the handling cost per ton is extremely low.

It will be understood that a tilting or rolling furnace may be employed, if desired, in place of the receptacle described, but whether the furnace or receptacle is stationary or capable of being tilted or rolled, the air blasts as above described will be employed. When a tilting or rolling furnace is used the slag may more readily be poured off, and the position of the twyers relative to the bath can be varied at will. By varying the position of the twyers relative to the bath, the blasts may be directed so as to blow either downwardly onto the bath at the point of contact of the cinder and metal, or into and through the metal, or, if desired, across the top of the bath on planes parallel to the surface of the bath.

It has been found that by admitting flue dust either into the receptacle upon the bath, or into the air blast before passing to the twyers, large quantities of such dust can be utilized and will reduce the proportions of other oxids necessary. By admitting the flue dust to the blast and carrying it with the blast through the twyers it is delivered with the excess of oxygen of the blast to the point of contact of cinder and molten metal, which is the desired point for accomplishing a rapid reaction. If desired, the flue dust may be run into the receptacle direct from the dust catcher in quantities regulable by means of suitable valves or gates.

Having thus described my invention, I claim.

1. The process of making liquid steel which consists in collecting within a covered receptacle adjacent the blast furnace a bath of molten iron run from said furnace in quantity sufficient to keep the bath liquid throughout the entire process without the aid of external heat by conserving and utilizing the initial heat of the molten iron, then subjecting the molten iron to the action of suitable oxidizing agents and a blast of air directed downwardly onto the surface of the bath within the receptacle whereby the reaction between the molten metal and the slag is facilitated then in adding to the bath steel producing substances and then drawing from the receptacle finished steel in a liquid state.

2. The process of making liquid steel low in phosphorus from ore high in phosphorus which consists in smelting high phosphorous ore in a blast furnace, then collecting the molten iron resulting from said smelting in a receptacle immediately adjacent to the furnace in quantity sufficient to keep the bath liquid throughout the entire process without the aid of external heat by conserving and utilizing the initial heat of the molten metal, then bringing the molten metal of the bath into contact with metallic oxids and suitable fluxes, then in subjecting the bath to one or more blasts of air directed downwardly upon its surface then in adding to the bath steel producing substances and finally running steel from the receptacle in a liquid state.

3. The process of making liquid steel which consists in smelting iron ore in a blast furnace, in collecting molten iron resulting from said smelting together with furnace cinder in a receptacle immediately adjacent the furnace, such iron being in quantity sufficient to keep the bath liquid throughout the entire process by conserving and utilizing the initial heat of the molten iron therefor, in simultaneously subjecting the molten metal of the bath to the action of suitable metallic oxids and fluxes and one or more blasts of air directed downwardly upon the surface of the bath thereby maintaining a strongly oxidizing atmosphere at the point of contact of slag and molten metal then in adding to the bath steel producing substances and then running off steel in a liquid state.

4. The process of making steel, which consists in collecting a super-molten bath of at least fifty tons of molten iron, in subjecting the bath to the action of suitable oxidizing agents and one or more air-blasts, and then adding to the bath such substance or substances as will produce steel of the desired analysis.

5. The process of making steel, which consists in collecting within a covered receptacle a bath of super-molten iron in such quantity that it will remain liquid throughout the process, in subjecting the bath to the action of suitable oxids and fluxes and one or more air-blasts, then in driving off the occluded gases and bringing the bath to the desired analysis finally withdrawing finished steel in a liquid state.

In testimony whereof I have hereunto subscribed my name this 26th day of November, 1904.

HERMAN A. BRASSERT.

Witnesses:
JNO. S. GREEN,
E. D. NUGENT.

Copies of this patent may be obtained for five cents each, by addressing the "Commissioner of Patents, Washington, D. C."